March 11, 1969 G. STRACHANOW 3,432,719

TRANSISTORIZED SCANNING CIRCUIT WITH SERIES-CONNECTED CAPACITORS INCLUDED IN THE OSCILLATOR INPUT CIRCUIT

Filed Jan. 26, 1965

INVENTOR.
Grigory Strachanow
BY James E. Tracy
Atty.

3,432,719
Patented Mar. 11, 1969

1

3,432,719

TRANSISTORIZED SCANNING CIRCUIT WITH SERIES-CONNECTED CAPACITORS INCLUDED IN THE OSCILLATOR INPUT CIRCUIT

Grigory Strachanow, Des Plaines, Ill., assignor to Zenith Radio Corporation, Chicago, Ill., a corporation of Delaware Filed Jan. 26, 1965, Ser. No. 428,098
U.S. Cl. 315—27 15 Claims
Int. Cl. H01j 29/70

ABSTRACT OF THE DISCLOSURE

The scanning circuit features a free-running relaxation oscillator comprising a plurality of series-connected capacitors serving three different functions; (1) in conjunction with an adjustable resistor they determine the free-running frequency of the oscillator, (2) the capacitors form a sawtooth voltage for driving an amplifier which in turn effects the development of sawtooth scanning current in the deflection yoke of a CRT, and (3) in response to a feedback signal, translated from the output of the amplifier and through an adjustable linearity control resistor, the capacitors effect wave shaping to compensate any undesired distortion, such as non-linear distortion, that may otherwise be introduced in the scanning current. In accordance with another feature, size control and linearity control adjustments may be made independent of each other by having the amplifier, driven by the oscillator, take the form of an emitter follower, and by employing a size control potentiometer between the output of the emitter follower and the yoke. Since the internal output impedance of an emitter follower is relatively low, changes of the setting of the potentiometer effect no appreciable variation of that impedance. Hence, the feedback signal source (namely the output of the emitter follower) presents a constant impedance to the linearity control circuit irrespective of the setting of the size control. The scanning circuit also features an output amplifier whose bias current is of constant magnitude for all settings of the size control, even though the sawtooth driving signal applied to that amplifier has a D.C. component of an amplitude dependent on the size control setting. This is accomplished by establishing both of the end terminals of the potentiometer at the same D.C. potential.

Figures 1, 2:
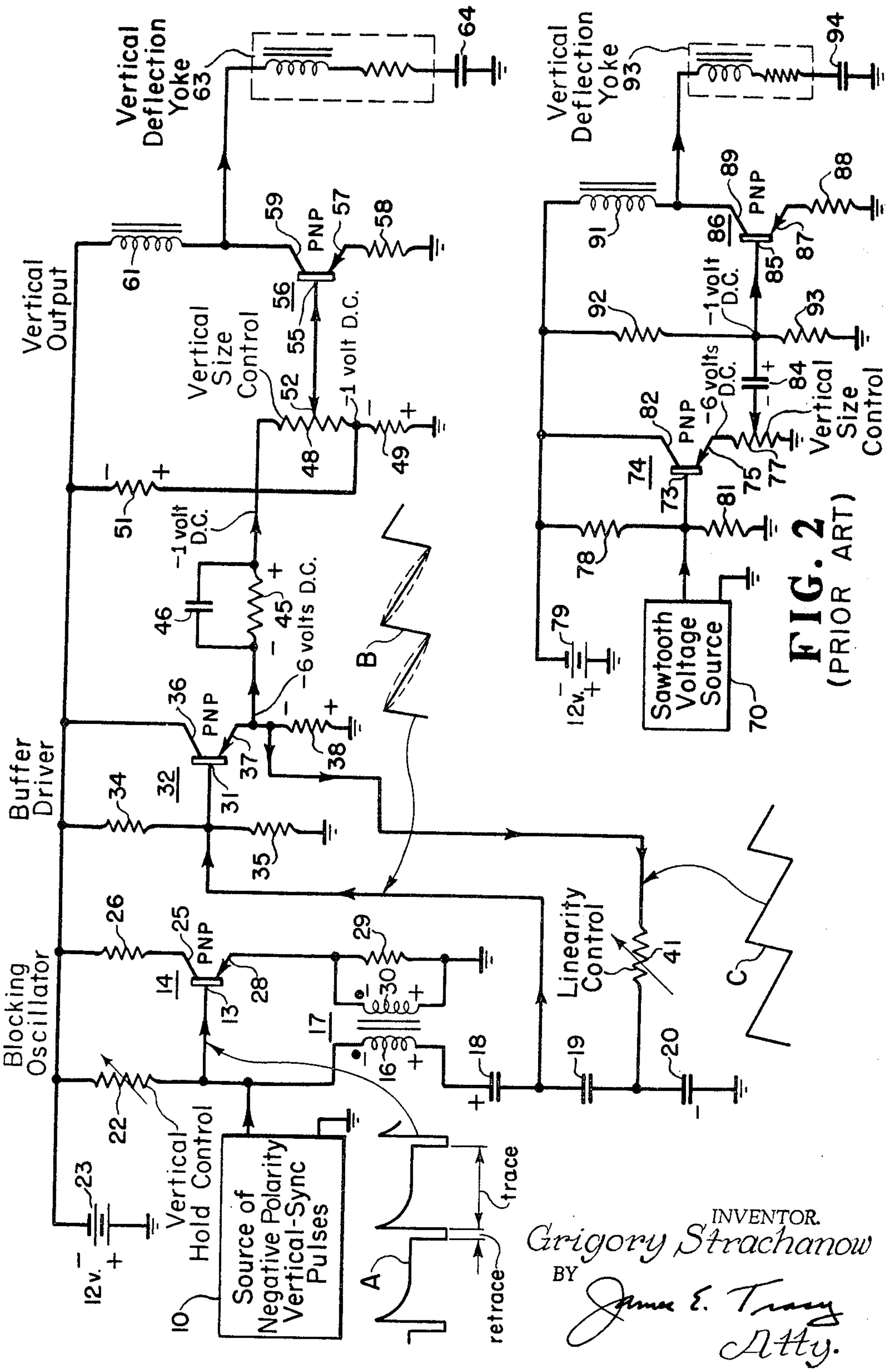
FIG. 1, FIG. 2 (PRIOR ART)

This invention pertains to a new and improved transistorized scanning circuit for developing a sawtooth shaped scanning signal for the scanning or sweeping element of a cathode ray tube. Although the scanning circuit of the invention finds useful application for any cathode ray tube having either an electrostatic or an electromagnetic type sweep system, the invention will, for convenience, be described in conjunction with the electromagnetic type, free-running vertical deflection system for the picture tube of a television receiver.

Most, if not all, of the transistorized free-running vertical scanning or deflection systems developed heretofore suffer from at least one of a variety of different shortcomings, all of which the present invention overcomes. One disadvantage of the prior systems arises because of the desirability to include linearity, vertical size or picture height, and vertical hold or frequency determining controls in the vertical scanning system.

Adjustable non-linear correction of some type is necessary in order to compensate distortion and to obtain scanning current of a waveform to effect precise linear beam deflection on the screen of the picture tube. The non-linear distortion that must be compensated is attributed to several factors, such as loading and non-linearity of the sawtooth signal source, decreasing transistor Beta with increasing collector current, and the inductance of the yoke. On the other hand, there may be times when it is desirable to purposely introduce a non-linear component in the sawtooth yoke current. For example, in sweeping a relatively wide angle, short necked, flat faced picture tube the addition of a slight S-shaped component to the sweep signal is preferable in order that the vertical scanning velocity of the beam may be increased at the center section of the picture tube and decreased at the top and bottom. The scanning circuit of the present invention may be employed to correct undesirable non-linearity in the sweep current introduced by the system or it may be utilized to introduce S-shaped curvature to the scanning signal.

Provisions for adjusting the vertical size of the scanning raster and the free-running operating frequency of the scanning system are necessary to correct, for example, for power supply variations and for parameter changes due to aging of components. Unfortunately, in most of the prior transistorized vertical scanning systems the linearity compensation, size, and frequency determining circuits are so interrelated that adjustment of the vertical size control affects or disturbs linearity and operating frequency, and conversely, manipulation of either the linearity or vertical hold controls disturbs vertical size. Hence, adjustment of, for example, the size control not only requires readjustment of the vertical hold and linearity controls, but then the size control has to be readjusted. Alternate readjustment of all three controls is necessary.

The present invention solves this problem and provides, in accordance with one of its objects, a scanning system having size, frequency determining, and linearity controls which are independent of each other. With this arrangement, when any one of the controls is adjusted there will be no need to readjust the others.

A scanning circuit, constructed in accordance with this aspect of the invention, comprises an emitter follower amplifier having a relatively low internal output impedance. There are means coupling the output of the amplifier to a magnetic deflection yoke. Means are provided for developing a voltage of generally sawtooth waveform, and means are included for applying that sawtooth voltage to the input of the amplifier to develop scanning current in the magnetic deflection yoke of generally sawtooth waveform but subject to undesired, non-linear distortion. There are means for developing a feedback signal in the output of the amplifier. Wave-shaping means, including a feedback connection for supplying the feedback signal to the sawtooth voltage developing means, is provided for substantially compensating the non-linear distortion thereby to linearize the scanning current in the yoke. The operation of the wave-shaping means and the amount of compensation effected is influenced by and dependent on the output impedance presented by the amplifier to the feedback connection. Linearity control means are included in the feedback connection for adjusting the amplitude of the feedback signal to control the amount of non-linear compensation effected by the wave-shaping means. An adjustable size control potentiometer is included in the coupling means for adjusting the amplitude of the scanning current. The output impedance presented by the emitter follower amplifier to the feedback connection is sufficiently low that changes of the setting of the size control potentiometer effect no appreciable variation of that impedance thereby rendering size control and linearity control adjustments independent of each other in order that when one is adjusted there is no need to readjust the other.

Another feature of the scanning circuit of the present invention relates to the manner of producing a sawtooth drive voltage having an appropriate wave shape for effecting perfectly linear beam deflection on the picture tube face. Preferably, a vertical scanning circuit for a picture tube should be free-running and should operate cyclically in the absence of vertical synchronizing pulses. This is desirable under weak signal conditions. Moreover, it is preferred that a scanning raster be produced even in the complete absence of a television signal.

In one prior art scanning circuit a free-running relaxation oscillator, such as a blocking oscillator, is employed to develop relatively narrow pulses recurring at the vertical scanning rate, the oscillator containing a network of resistance and capacitance elements for determining its free-running frequency. These pulses are then applied to integrating and wave shaping circuits, employing additional and relatively large capacitive elements, to develop an appropriately shaped sawtooth drive voltage to cause the development of yoke scanning current free of non-linear distortion.

In another previously developed vertical scanning circuit, a blocking oscillator is employed as a switch to discharge the capacitance element of a resistance-capacitance sawtooth forming network, thereby to produce in the output of the network a sawtooth voltage which is then subjected to wave shaping. In a still further prior art vertical sweep system, the capacitance in the blocking oscillator serves not only as a frequency determining element but also functions to produce the initial sawtooth shaped voltage. A wave-shaping network, including additional capacitance elements, is subsequently utilized to shape the sawtooth voltage produced by the blocking oscillator to obtain a driving voltage of the required waveform.

The present invention not only produces a perfectly linear deflection on the picture tube screen, but moreover this is achieved by means of fewer circuit circuit elements or components than are required by any of the prior art arrangements. Furthermore, the components that are needed to serve certain of the functions are considerably less expensive than the counterparts components in some of the previous scanning systems.

It is therefore another object of the invention to provide a new, improved and less expensive transistorized scanning system which is particularly applicable to a television receiver.

It is a further object of the invention to provide a transistorized scanning system which may be designed or adjusted to develop a scanning current of any of a variety of predetermined waveforms.

An additional object of the invention is to provide a transistorized scanning circuit in which non-linearity of the sweep current may be corrected and linearized.

In accordance with this aspect of the invention, a cyclically operating transistorized scanning circuit comprises a free-running transistor relaxation oscillator including a network of resistance means and capacitance means for determining the free-running frequency of the oscillator, the capacitance means including a plurality of series-connected capacitors and developing a voltage of generally sawtooth waveform. There is a transistor amplifier, to the output of which is coupled a magnetic deflection yoke. There are means coupling the capacitance means to the input of the amplifier for driving the amplifier with the sawtooth voltage to develop scanning current in the magnetic deflection yoke of generally sawtooth waveform but subject to undesired, non-linear distortion. The scanning circuit also has wave-shaping means, including at least one of the capacitors and a feedback connection coupled from the output of the amplifier to the junction of two of the capacitors, for substantially compensating the non-linear distortion thereby to linearize the scanning current in the yoke.

Another problem which plagues transistorized vertical scanning circuits resides in an effect on the operation of the vertical output transistor, to which the yoke is coupled, caused by adjustment of the size control. Usually, vertical size or picture height adjustability is achieved by means of a potentiometer coupled to the input of the output transistor, the setting of the potentiometer determining the amplitude of the sawtooth shaped drive voltage for the output stage. It is also necessary to apply to the input of the transistor, such as between its base and emitter, a D.C. bias potential of a magnitude to establish the operating point of the transistor in the center of the linear portion of its dynamic transfer characteristic curve. In this way, the sawtooth shaped drive signal will be confined to the linear portion of the curve to minimize any distortion introduced by the transistor itself. Unfortunately, in many prior transistorized vertical scanning circuits the adjustment of the size control potentiometer varies the bias potential with the result that the transistor operating point is shifted on the dynamic transfer curve and distortion results.

In other prior scanning circuits, even though the bias potential remains substantially constant for all settings of the size control potentiometer, there is nevertheless an undesired, transient variation of the bias current when the potentiometer is adjusted. This gives rise to an undesired sudden change in the output current to the extent that the transistor may suffer permanent damage. This may occur since there are inductive components (the yoke and usually an inductance coil or output transformer) coupled to the output terminals of the transistor. A relatively high amplitude, transient current pulse produced in the output of the transistor results, due to the inductance, in a relatively high amplitude voltage pulse $$\left(L\frac{di}{dt}\right)$$

which may be high enough to burn up or destroy the transistor.

The present invention overcomes these disadvantages and provides, in accordance with a further object, a scanning circuit in which size control adjustments reflect no change in the bias current of the output transistor even on a transient basis.

A scanning circuit, constructed in accordance with this aspect of the invention, comprises an amplifier which includes a transistor having input, output and common terminals. A magnetic deflection yoke is coupled to the output and common terminals. There are means for applying a D.C. bias potential to the input and common terminals to translate D.C. bias current between the input and common terminals of a magnitude to bias the transistor for Class A operation. Direct current thereby flows continuously between the common and output terminals. The scanning circuit has means for developing a sawtooth shaped voltage having A.C. and D.C. components, and means for applying the A.C. component of the sawtooth shaped voltage to the input and common terminals to translate sawtooth shaped drive current between the input and common terminals thereby to develop sawtooth scanning current in the magnetic deflection yoke. A size control potentiometer, having two end terminals and an intermediate adjustable tap, is provided for adjusting the amplitude of the applied sawtooth voltage to vary the amplitude of the scanning current, the bias current flowing between the input and common terminals being subject to undesired amplitude variation at least on a transient basis with adjustment of the potentiometer thereby resulting in undesired amplitude change in the current flowing between the common and output terminals. The scanning circuit also comprises means for establishing both of the end terminals of the potentiometer at approximately the same D.C. potential thereby rendering the magnitude of the bias current substantially fixed irrespective of the setting of the potentiometer.

The features of this invention which are believed to be new are set forth with particularity in the appended claims. The invention, together with further objects and advantages thereof, may best be understood, however, by reference to the following description in conjunction with the accompanying drawing in which:

FIGURE 1 is a schematic diagram of a transistorized vertical scanning circuit for a television receiver constructed in acordance with the invention; and, FIGURE 2 illustrates a prior art vertical scanning circuit which is helpful in explaining the advantages of some of the features of the present invention.

In order to facilitate an understanding of the operation of the transistorized scanning circuit of the present invention, certain general concepts will initially be considered before discussing the circuit details of the disclosed embodiment. As is well known, the electron beam in a conventional cathode ray picture tube is swept across the face of the tube or screen in a repetitive manner under the influence of vertical and horizontal deflection or sweep signals. The vertical and horizontal scanning rates have been established in the United States at 60 and 15,750 complete scans per second, respectively. This basic difference in the scanning rates is one of the major factors which must be considered in the design of practical vertical and horizontal scanning circuits. At the slow or 60 cycle per second vertical rate, the conventional deflection yoke or coils in the television receiver appear substantially resistive while at the 15,750 horizontal scanning rate an equivalent deflection yoke acts substantially as an inductive reactance. As a result, the vertical deflection coils may be treated as a resistive impedance. It should, however, be realized that the inductive character of the vertical deflection yoke must be taken into account during the retrace or fly-back portion of the sweep cycle since a voltage spike or pulse appears across the yoke during this interval and is in series-aiding relation to the circuit voltage source; hence, it is instrumental in determining the required voltage rating of the transistor of the output stage.

Turning now to the description of the structure of FIGURE 1, pulse signal source 10 is preferably a conventional synchronizing signal separator of a television receiver which produces negative polarity vertical-sync pulses recurring at the vertical scanning rate. One output terminal of vertical sync source 10 is connected to a plane of reference potential, such as ground, while the other is connected to the input terminal or base 13 of a conventional junction type PNP transistor 14. Base 13 is also coupled to ground through, in the order named, the series arrangement of the secondary winding 16 of a two-winding transformer 17, and three capacitors 18, 19 and 20. Base 13 is also coupled through an adjustable resistor 22 to the negative terminal of 12 volt unidirectional potential source, shown as a battery 23, the positive terminal of which is grounded. The output terminal or collector 25 of transistor 14 is coupled via a current limiting resistor 26 to the negative terminal of D.C. voltage source 23. The common terminal or emitter 28 of the transistor is connected to ground by way of the primary winding 30 of transformer 17 shunted by a resistor 29. The windings of the transformer are polarized so that the phase of a signal produced at the upper terminal or secondary winding 16 will be the same as the phase of the signal applied to the upper terminal of primary 30.

As thus far described, except for the employment of the three series connected capacitors 18, 19 and 20, the circuitry associated with transistor 14 constitutes a somewhat conventional blocking oscillator which has a free-running operating frequency determined primarily by the setting of resistor 22 and the electrical values of capacitance elements 18, 19 and 20. The use of the three capacitors 18, 19 and 20 instead of one is most unconventional. They provide a capacitive voltage divider for reasons which will become apparent. Since resistor 22 is the only frequency determining element which is adjustable, it constitutes the adjustable frequency determining control of the oscillator, or what is customarily designated the "vertical hold control." The oscillator is usually adjusted to have a free-running frequency which is slightly below or slower than the vertical synchronizing frequency. In the presence of vertical sync pulses, however, the oscillator will function at the recurrence frequency of the syncs.

The junction of capacitors 18 and 19 is directly connected to the input terminal or base 31 of another junction type transistor 32 of the PNP variety. The base is connected to the negative terminal of potential source 23 through a bias resistor 34 and is returned to ground via a bias resistor 35. The combination of resistors 34 and 35 consequently constitute a voltage divider across 12-volts source 23 to apply an appropriate bias potential to base 31. Collector or output terminal 36 of transistor 32 is directly connected to the negative terminal of potential source 23, and the common terminal or emitter 37 of the transistor is connected to ground through an emitter load resistor 38. Transistor 32 and its associated circuit elements are arranged to provide a conventional emitter follower amplifier stage, resistors 34 and 35 biasing the stage for Class A operation. As will be seen, the emitter follower develops a sawtooth shaped signal for driving a vertical output stage while at the same time it serves as a buffer between the blocking oscillator and output amplifier. Hence, the emitter follower stage is appropriately labeled a "Buffer Driver."

A feedback circuit is coupled from the output of the emitter follower to the blocking oscillator. Specifically, a variable resistor 41 is connected from emitter 37 of transistor 32 to the junction of capacitors 19 and 20. As will be seen later, capacitors 18, 19 and 20 develop a voltage of generally sawtooth waveform, a portion of which is employed to drive the emitter follower. These same capacitors in conjunction with feedback resistor 41 provide wave-shaping means for shaping or forming the sawtooth voltage applied to base 31 of the emitter follower amplifier, the sawtooth voltage being of the required shape to ultimately effect the development of linear sawtooth yoke scanning current. Resistor 41 is made adjustable in order that the amplitude of the signal fed back to the capacitors may be adjusted, thereby to control the amount of wave shaping taking place. This resistor is therefore appropriately labeled "linearity control."

Emitter 37 is also connected through a resistor 45, which is shunted by a capacitor 46, to one terminal, specifically the upper terminal, of a potentiometer 48, the other or lower terminal of which is connected through a resistor 49 to ground. The junction of potentiometer 48 and resistor 49 is connected through a resistor 51 to the negative terminal of potential source 23. The adjustable tap 52 of the potentiometer is directly connected to the base or input terminal 55 of another conventional junction type PNP transistor 56. The common terminal or emitter 57 of the transistor is returned to ground through a degenerative unbypassed resistor 58. The collector or output terminal 59 is connected through an inductor 61 to the negative terminal of voltage source 23, and it is also connected to one terminal of a magnetic vertical deflection yoke 63, the other terminal of which is coupled through a D.C. blocking condenser 64 to ground. As shown, yoke 63 contains both resistance and inductance. As mentioned previously, however, at the vertical scanning rate normally employed in television receivers the vertical deflection coils or yoke is substantially resistive during the trace intervals. Inductance coils 61 provides a relatively high impedance with respect to the sweep current.

As will be described in detail hereinafter, a sawtooth shaped drive voltage is produced between tap 52 of potentiometer 48 and ground and this voltage is applied to the input or base terminal 55 of transistor 56 which in turn causes sawtooth shaped scanning current to be developed in magnetic deflection yoke 63. Since transistor 56 drives the yoke, that transistor in conjunction with its associated circuit elements constitutes the verical output amplifier stage of the scanning circuit. Varying the setting of potentiometer 48 varies the amplitude of the sawtooth shaped input drive voltage for output transistor 56, thereby varying the amplitude of the sawtooth shaped scanning current in the yoke. Since the amplitude of the scanning current determines the vertical size or picture height of the scanning raster, potentiometer 48 is appropriately designated the "vertical size control."

In describing the operation of the scanning circuit of FIGURE 1 in somewhat more detail, attention is also directed to the illustrated idealized voltage signal waveforms which appear at various points in the circuit. The blocking oscillator generally functions in conventional fashion and develops a sawtooth shaped voltage for application to the emitter follower. Ignoring the effect of the negative-going vertical sync pulses from the source 10 for the moment, the blocking oscillator operates at its free-running frequency which is determined principally by vertical hold control resistor 22 and capacitors 18, 19 and 20. In analyzing the operation of the oscillator, a sawtooth cycle will be considered starting at the instant a trace portion terminates and the immediately succeeding retrace or flyback interval commences. During each trace interval, transistor 14 is held in its off or non-conductive condition in a manner to be explained. At the end of the trace, base 13 becomes slightly negative with respect to emitter 28, in a manner also to be described, and since transistor 14 is of the PNP type, the base-emitter junction becomes forward biased to cause the translation of emitter-collector current in a direction from the emitter to the collector. This current, of course, also flows through the shunt combination of resistor 29 and primary winding 30 to produce a negative-going voltage at the upper terminal of winding 30 which is fed back to base 13 by virtue of secondary 16. The feedback is in a positive or regenerative sense; namely it is of a polarity which increases the base voltage in whichever way it is already changing. The negative-going voltage at the upper terminal of secondary winding 16 therefore increases the base voltage in a negative direction to effect an increase in the emitter-collector current flow.

This regenerative action continues and the emitter-collector current flow rapidly increases to the saturation level of the transistor, the specific time interval required being determined primarily by the inductance of transformer 17 which tends to slow down the rate of increase. Meanwhile, while the emitter-collector current is driven toward saturation, the feedback voltage developed across secondary 16 charges capacitors 18, 19 and 20 with the polarity shown (namely, the upper terminal of capacitor 18 is positive with respect to ground), the charging current flowing through the base-emitter junction of transistor 14. During this relatively short interval of rising emitter-collector current, the capacitors charge essentially to the peak value of the feedback voltage.

When the current saturation level is reached, the feedback voltage drops to zero and the base voltage decreases from a peak negative amplitude toward zero. The positive-going (namely, becoming less negative) base voltage therefore decreases the emitter-collector current and feedback voltage is again developed in transformer 17 but this time it will be of a polarity such as to drive the base more and more positive-going which, in turn, causes further decrease of collector current until the current drops to zero. The positive voltage to which capacitors 18, 19 and 20 had previously charged now forces base 13 to a relatively high positive amplitude level far beyond cutoff of the transistor.

Transistor 14 is now cut off and this terminates the retrace interval. The positive potential at the upper terminal of capacitor 18 holds the transistor in its off condition throughout the entire succeeding trace interval. During that time the three capacitors discharge slowly through vertical hold control resistor 22 toward the negative potential of source 23, allowing base 13 to become less and less positive until reaching zero voltage and then a slight negative voltage, at which instant the transistor starts to conduct and another retrace interval is initiated. Waveform A depicts the voltage found at base 13 relative to ground.

The particular setting of the hold control resistor determines the discharge time constant of the blocking oscillator and thus determines the duration of the trace interval and consequently the frequency of operation. As mentioned previously, hold control resistor 22 is preferably adjusted so that the oscillator will oscillate at a rate slightly slower than the pulse recurrence rate or frequency of the vertical sync pulses. In this way, when negative-going vertical sync pulses are supplied from source 10 to base 13, the instant of firing or turning on of transistor 14 to terminate a trace interval is determined by a negative sync pulse.

Since the series arrangement of capacitors 18, 19 and 20 charges relatively rapidly to a positive potential during retrace and then discharges relatively slowly to zero potential during trace, a sawtooth shaped voltage with a negative slope during trace is developed between the upper terminal of capacitor 18 and ground. Since the capacitors also form a voltage divider, such a sawtooth shaped voltage is also developed at the junction of capacitors 18 and 19, as illustrated by waveform B, for application to base 31. The significance of the dashed construction lines of waveform B will be explained shortly.

The buffer driver or emitter follower is biased for Class A operation, as mentioned before. Hence, applying the sawtooth shaped drive signal of waveform B between base 31 of transistor 32 and ground results in the development across emitter load resistor 38 of a signal of the same waveshape and phase, as illustrated by voltage waveform C. The output voltage signal at emitter 37 (namely curve C) drives output transistor 56 to develop scanning current in magnetic deflection yoke 63. As mentioned previously, however, to obtain a perfectly linear sawtooth current waveform in the yoke requires a sawtooth drive voltage of controllable wave shape in order to compensate for a variety of characteristics or conditions of the system which introduce undesired, non-linear distortion. Adjustable wave shaping is accomplished in accordance with a feature of the present invention by feeding the output signal (waveform C) of the emitter follower back to the junction of capacitors 19 and 20 through linearity control feedback resistor 41.

More specifically, emitter 37 supplies sawtooth shaped current through resistor 41 to capacitor 20. Since a capacitor functions as an integrating device with respect to the current supplied thereto, the sawtooth shaped current fed back from the emitter follower produces a voltage component of parabolic wave shape across capacitor 20. Of course, the actual voltage wave shape across condenser 20 will be a composite of the sawtooth developed in discharging through vertical hold control 22 and the parabolic component produced by the feedback circuit. The amount of parabolic component can be adjusted merely by varying the amount of sawtooth current fed back from emitter 37. This is done by adjusting linearity control 41. Maximum feedback current (with resistor 41 adjusted to present the least resistance) results in a maximum parabolic voltage component across capacitor 20, while minimum feedback current from emitter 37 (namely, with resistor 41 set for maximum resistance) results in a minimum parabolic voltage component across condenser 20.

The voltage wave shape across capacitor 20, of course, influences the shape of the voltage (curve B) applied to base 31 of the emitter follower. It has been found, in the disclosed embodiment, that the trace portions of waveform B may be varied within the limits defined by the dashed construction lines by manipulation of linearity control resistor 41. Moreover, it has also been determined that variation of the drive voltage, supplied to the emitter follower, within those limits provides sufficient control to compensate for any non-linear distortion introduced in the system or alternatively to purposely introduce curvature, such as S-shaped curvature, thereby achieving perfectly linear beam deflection. Of course, changing the relative electrical sizes of capacitors 18, 19 and 20 also influences the shaping introduced.

Before leaving the discussion of the blocking oscillator and the buffer driver, it will be noted that capacitance means 18, 19 and 20 serve three different functions. Initially, the capacitors, along with vertical hold control resistor 22, determine the free-running frequency of the blocking oscillator. Secondly, the capacitance means form the basic sawtooth voltage for the entire scanning system. Thirdly, the capacitors are included in the wave-shaping means which compensate any nonlinear distortion which may be introduced in the system. Capacitor 18 has a fourth function—it serves as a D.C. blocking capacitor for providing D.C. isolation between the blocking oscillator and the buffer driver. Specifically, capacitor 18 blocks the D.C. variations on base 13 from base 31, and vice versa.

Since the emitter follower operates at Class A, there will be a constant D.C. current flow through emitter load resistor 38 and the emitter-collector path of transistor 32. Consequently, the sawtooth shaped voltage developed at emitter 37 will have a D.C. component in addition to its A.C. component. In the particular embodiment shown, which has a basic D.C. power supply of 12 volts, the D.C. component of the sawtooth shaped voltage at emitter 37 is approximately −6 volts as indicated in the drawing.

The sawtooth shaped voltage, with its A.C. and D.C. components, is impressed across the voltage divider including resistor 45, shunted by capacitor 46, size control potentiometer 48, and resistor 49. Capacitor 46 is of such electrical size that it presents substantially zero impedance to the A.C. component of the sawtooth voltage. Consequently, the entire A.C. component is found between the upper terminal of potentiometer 48 and ground. The ratios of resistors 45, 48 and 49 are arranged, however, that the −6 volts D.C. is so divided over those resistors that the upper terminal of potentiometer 48 is established at approximately −1 volt D.C. The combination of resistors 51 and 49 constitutes a voltage divider across D.C. source 23 and these resistors are so proportioned, in relation to the proportioning of resistors 45, 48 and 49, that the three-way junction of resistors 51, 48 and 49 is also established at −1 volt D.C.

The two terminals of size control potentiometer 48 are therefore both established at the same D.C. potential and thus no matter where the potentiometer is set the very same D.C. potential (−1 volt) is impressed as a bias voltage between base 55 of output transistor 56 and ground. The −1 volt D.C. potential at the base establishes a forward bias for output transistor 56 and translates D.C. bias current between common terminal or emitter 57 and input terminal 55 of a magnitude to bias the transistor for Class A operation. In the described embodiment, the bias voltage is appropriate to establish the operating point of the transistor in the center of the linear portion of its dynamic transfer characteristic curve.

The A.C. component of the sawtooth voltage is developed between adjustable tap 52 of the potentiometer and ground and is therefore applied between base 55 and ground to drive the output transistor and develop sawtooth shaped scanning current in yoke 63. Adjustment of potentiometer 48 varies the amplitude of the sawtooth drive voltage supplied to the output transistor and changes the amplitude of the scanning current. However, since the D.C. potential is approximately the same at either end of the potentiometer, the bias voltage for transistor 56 remains substantially the same irrespective of the setting of the potentiometer. In this way, the operating point on the transfer characteristic of transistor 56 remains fixed so that no non-linear distortion is introduced by the output transistor.

Of course, since the base-emitter resistance of transistor 56 plus the resistance of resistor 58 is connected between tap 52 and ground, the D.C. potential at the top of the potentiometer is slightly different when tap 52 is at its uppermost setting as compared to when the tap is at its lowermost setting and, by the same token, the D.C. potential at the lower terminal of the potentiometer is very slightly different when tap 52 is at its lowermost position as compared to when it is at its uppermost setting. However, the very slight variations in D.C. are negligible and the D.C. potential between tap 52 and ground is always approximately −1 volt to effect a constant base bias of the output transistor.

To fully appreciate the advantages of the size control and bias arrangement of the invention, attention is directed to FIGURE 2 which shows a scanning circuit constructed in accordance with the most pertinent prior art of which applicant is aware. In the circuit of FIGURE 2, a sawtooth voltage source 70 produces a voltage of sawtooth waveshape with negative-going amplitude during each trace portion. The sawtooth voltage is impressed between base 73 of PNP transistor 74 and ground, the emitter 75 of the transistor being connected to ground through a vertical size control potentiometer 77. Base 73 is connected through a resistor 78 to the negative terminal of a source of 12 volts D.C. potential 79, the positive terminal of which is grounded, and the base is also connected through a resistor 81 to ground. Resistors 78 and 81 therefore provide a voltage dividing arrangement across potential source 79 to apply a bias voltage to base 73 for Class A operation. Collector 82 of the transistor is directly connected to the negative terminal of voltage source 79. Transistor 74 and its associated circuit components constitutes an emitter follower similar to the emitter follower or buffer driver in FIGURE 1, except that the fixed emitter load resistor 38 of FIGURE 1 is replaced by a potentiometer in FIGURE 2.

A sawtooth shaped voltage with A.C. and D.C. components is therefore developed between emitter 75 and ground in FIGURE 2 and a portion of this voltage, as determined by the setting of the potentiometer, is tapped off and applied by way of a D.C. blocking capacitor 84 to the base 85 of a PNP output transistor 86. The emitter 87 of the output transistor is connected to ground through an unbypassed emitter resistor 88 and the collector 89 is D.C. connected to the negative terminal of source 79 by way of inductance coil 91, which is provided to present a high impedance for the sweep current. A voltage divider comprising the series arrangement of a pair of resistors 92 and 93 is connected across voltage source 79, the junction of the resistors being D.C. connected to base 85. The ratio of resistors 92 and 93 is established so that a bias voltage of −1 volt D.C. is impressed on base 85 with respect to ground. Collector 89 is coupled through the series arrangement of a vertical deflection yoke 93 and a D.C. blocking capacitor 94 to ground.

Transistor 86 and its associated circuitry constitutes the vertical output stage. Since base 85 is D.C. connected to a fixed point on the voltage divider 92, 93, it would appear at first blush that a constant base voltage of −1 volt will be found on base 85 to produce constant bias current irrespective of the setting of potentiometer 77. Of course, the potentiometer adjustment will determine the amplitude of the sawtooth shaped drive voltage applied to base 85. However, the prior art arrangement of FIGURE 2 suffers from a very serious disadvantage in that the output transistor 86 is subject to developing transient voltage spikes which may have peak amplitudes sufficient to damage and destroy the transistor.

Specifically, since there is a D.C. voltage all along vertical size control potentiometer 77 (a voltage of negative 6 volts D.C. being found at the upper terminal of the potentiometer), a D.C. voltage will be applied to the left terminal of capacitor 84 of a magnitude which depends on the setting of the potentiometer. The D.C. voltage on the right terminal of capacitor 84, on the other hand, will be relatively fixed at −1 volt due to the voltage divider 92, 93. The presence of a variable D.C. voltage on one side of capacitor 84 results in charging and discharging current as the size control potentiometer is lowered up and down. For example, when the potentiometer is adjusted to a higher setting the D.C. potential on the left side of capacitor 84 increases in a negative sense towards −6 volts, depending on how far up the potentiometer is set. Transient charging current for the capacitor therefore flows through the base-emitter junction of output transistor 86 in the direction from emitter 87 to base 85. Depending on the Beta of the transistor, the transient increase in base-emitter current results in amplified emitter-collector transient current. This rapidly increasing collector current flows through the inductance in the output circuit of transistor 86 and because of the presence of that inductance a relatively high amplitude voltage pulse of a peak value $$L\frac{di}{dt}$$

(the inductance multiplied by the time rate of change of collector current) will be produced at collector 89. This peak amplitude may very well be adequate to permanently damage the transistor.

The circuit of the present invention, as embodied in FIGURE 1, does not suffer from this shortcoming since there is never a significant change in emitter-base bias current even on a transient basis when size control potentiometer 48 is adjusted. The problem arises in FIGURE 2 because of the necessity of A.C. coupling capacitor 84 to isolate the D.C. voltage at potentiometer 77 from base 85. Without a fixed D.C. voltage across capacitor 84, high amplitude transient current flows through output transistor 86. The present invention also has a capacitor 46 for applying the A.C. component of the sawtooth shaped voltage to the input and common terminals of the output transistor. However, since the left and right terminals of capacitor 46 are always established at −6 volts D.C. and −1 volt D.C. respectively, even while potentiometer 48 is being repositioned, the D.C. potential difference across the capacitor is always held constant.

Another advantage of the present invention can also be fully appreciated by comparing the prior art arrangement of FIGURE 2 with the circuit of FIGURE 1. As mentioned hereinbefore, emitter resistor 38 of the emitter follower of FIGURE 1 constitutes a source of a sawtooth shaped feedback signal which is fed back by way of linearity control 41 to capacitor 20. Control resistor 41 adjusts the amplitude of the feedback signal to control the amount of non-linear compensation effected by the wave-shaping means. Feedback signal source 38 represents a certain impedance and the operation of the wave-shaping means and the amount of compensation effected is influenced by that impedance. In the present invention, the impedance between emitter 37 and ground is substantially constant no matter where size control potentiometer 48 is positioned. This is due to the inherent characteristic of an emitter follower of having a relatively low internal output impedance, thus constituting a low impedance signal source. The emitter follower output impedance presented to the feedback connection is sufficiently low that changes of the setting of size control 48 effect no appreciable variation of that impedance. Hence, once linearity control 41 is adjusted to establish the correct degree of linearity compensation, the wave shaping introduced is not affected by any subsequent adjustment of size control potentiometer 48. As a consequence, size control and linearity control adjustments are entirely independent of each other in the circuit of the present invention.

In similar fashion, the free-running frequency of operation of the blocking oscillator of FIGURE 1 is influenced by the impedance presented to the output of the oscillator. In prior circuits, that impedance is subject to change, and the frequency determining control means, namely the vertical hold control, must be adjusted to return the frequency of operation back to the desired frequency. In the present invention, readjustment of the vertical hold control is not necessary when the size control potentiometer is positioned due to the constant impedance presented by the emitter follower to the oscillator. Thus, the frequency determining and size control adjustments are independent of each other.

The invention therefore provides a new and improved transistorized scanning circuit which achieves extremely beneficial results not obtainable heretofore by prior scanning circuits.

The circuit of FIGURE 1 has been constructed and successfully operated and favorable results have been obtained by utilizing the following circuit parameters.

| | |
|---|---|
| Source 23 | 12 volts D.C. |
| Variable resistor 22 | 5K ohms variable resistor in with 3.9K fixed resistor. |
| Transformer 17 | Primary 50 millihenries, 3 ohms; secondary 200 millihenries, 21 ohms. |
| Capacitor: | |
| 18 | 12 microfarads. |
| 19 | 25 microfarads. |
| 20 | 25 microfarads. |
| Transistor 14 | 2N1373. |
| Resistor: | |
| 26 | 33 ohms. |
| 29 | 150 ohms. |
| 34 | 8.2K ohms. |
| 35 | 6.8K ohms. |
| Transistor 32 | 2N1303. |
| Resistor 38 | 470 ohms. |
| Variable resistor 41 | 100 ohms fixed resistor in series with 100 ohms variable resistor. |
| Resistor 45 | 3.9K ohms. |
| Capacitor 46 | 200 microfarads. |
| Potentiometer 48 | 100 ohms. |
| Resistor 49 | 75 ohms. |
| Resistor 51 | 680 ohms fixed resistor in series with 2.5K ohms variable resistor. |
| Transistor 56 | 2N458A. |
| Resistor 58 | 3.3 ohms. |
| Inductance coil 61 | 360 millihenries. |
| Yoke 63 | 30 millihenries, 25 ohms. |
| Capacitor 64 | 500 microfarads. |

While a particular embodiment of the invention has been shown and described, modifications may be made, and it is intended in the appended claims to cover all such modifications as may fall within the true spirit and scope of the invention.

I claim:

1. A cyclically operating transistorized scanning circuit comprising:

a free-running blocking oscillator including a first transistor having a base, an emitter and a collector, and a network of resistance means and capacitance means for determining the free-running frequency of said oscillator, said capacitance means developing a voltage of generally sawtooth waveform and including a capacitive voltage divider consisting of first, second and third capacitors series-connected in the order named between the base of said first transistor and a plane of reference potential;

an emitter follower amplifier stage including a second transistor having a base, an emitter and a collector and an emitter resistor connected between the emitter of said second transistor and said plane of reference potential;

a magnetic deflection yoke coupled to the emitter of said second transistor;

means coupling the junction of said first and second capacitors to the base of said second transistor for driving said emitter follower stage with said sawtooth voltage to develop scanning current in said magnetic deflection yoke of generally sawtooth waveform but subject to undesired, non-linear distortion;

and wave-shaping means, including at least a portion of said capacitance means and a feedback connection coupled from the emitter of said second transistor to the junction of said second and third capacitors, for substantially compensating said non-linear distortion thereby to linearize said scanning current in said yoke.

2. A scanning circuit comprising:

an amplifier including a transistor having input, output and common terminals;

a magnetic deflection yoke coupled to said output and common terminals;

means for developing a sawtooth shaped voltage having A.C. and D.C. components;

means including a capacitor for applying the A.C. component of said sawtooth shaped voltage to said input and common terminals to develop sawtooth shaped scanning current in said magnetic deflection yoke;

a size control potentiometer for adjusting the amplitude of the applied A.C. component to vary the amplitude of said scanning current;

means for applying between said input and common terminals a D.C. bias potential of a magnitude which remains substantially fixed irrespective of the setting of said potentiometer;

and means for maintaining a constant D.C. potential difference across said capacitor irrespective of the setting of said potentiometer.

3. A scanning circuit comprising:

an amplifier including a transistor having input, output and common terminals;

a magnetic deflection yoke coupled to said output and common terminals;

a signal source, including a size control potentiometer having two end terminals and an intermediate adjustable tap, for producing a sawtooth shaped voltage having A.C. and D.C. components;

means, including a D.C. connection between said adjustable tap and said input terminal, for applying between said input and common terminals of said transistor a selected portion of said sawtooth shaped voltage as determined by the setting of said potentiometer to develop in said magnetic deflection yoke sawtooth shaped scanning current of adjustable amplitude, the D.C. component of the applied sawtooth voltage having a magnitude also dependent on the setting of said potentiometer and establishing between said input and common terminals an operating bias which is subject to undesired variation with adjustment of said potentiometer;

and means for establishing both of said end terminals of said potentiometer at approximately the same D.C. potential to render the magnitude of the D.C. component of said applied sawtooth voltage, and consequently the operating bias of said transistor, substantially fixed irrespective of the setting of said potentiometer.

4. A scanning circuit comprising:

an amplifier including a transistor having input, output and common terminals;

a magnetic deflection yoke coupled to said output and common terminals;

means for developing a sawtooth shaped voltage having A.C. and D.C. components of predetermined amplitudes;

a size control potentiometer having two end terminals and an intermediate adjustable tap;

means, including a capacitor shunted by a resistor, for applying said sawtooth shaped voltage to said potentiometer;

means, including a D.C. connection between said adjustable tap and said input terminals, for applying between said input and common terminals of said transistor a selected portion of said sawtooth shaped voltage as determined by the setting of said potentiometer to develop in said magnetic deflection yoke sawtooth shaped scanning current of adjustable amplitude, the D.C. component of the applied sawtooth voltage having a magnitude also dependent on the setting of said potentiometer and establishing between said input and common terminals an operating bias which is subject to undesired variation with adjustment of said potentiometer;

and means for establishing both of said end terminals of said potentiometer at approximately the same D.C. potential to render the magnitude of the D.C. component of said applied sawtooth voltage, and consequently the operating bias of said transistor, substantially fixed irrespective of the setting of said potentiometer, and for also maintaining a constant D.C. potential difference across said capacitor irrespective of the setting of said potentiometer.

5. A scanning circuit comprising:

an amplifier including a transistor having input, output and common terminals;

a magnetic deflection yoke coupled to said output and common terminals;

a signal source, including a size control potentiometer having two end terminals and an intermediate adjustable tap, for producing a sawtooth shaped voltage having A.C. and D.C. components, adjustment of said tap varying the amplitudes of both of said components;

means D.C. coupling said signal source to said input and common terminals for driving said amplifier to develop in said magnetic deflection yoke sawtooth shaped scanning current of an amplitude determined by the setting of said potentiometer, said D.C. component of said sawtooth shaped voltage establishing an operating bias between said input and common terminals; and means for establishing both of said end terminals of said potentiometer at approximately the same D.C. potential to render the magnitude of said D.C. component, and consequently the operating bias of said transistor, substantially fixed irrespective of the setting of said potentiometer.

6. A scanning circuit comprising:

a magnetic deflection yoke;

an amplifier including a transistor having input, output and common terminals, an input circuit coupled to said input and common terminals, and an output circuit coupled to said output and common terminals;

means for coupling said output circuit to said magnetic deflection yoke;

a size control potentiometer having an adjustable tap D.C. coupled to said input terminal;

a D.C. voltage dividing series network including, in the order named, a first resistor, said potentiometer, and a second resistor;

another D.C. voltage dividing series network including a third resistor and said second resistor;

means for D.C. coupling said second resistor to said common terminal of said transistor thereby to include said second resistor and the portion of said potentiometer between said tap and said second resistor in the input circuit of said amplifier and in series with said input and common terminals;

means for applying D.C. voltages across both of said voltage dividing networks, the D.C. voltage at the junction of said first resistor and said potentiometer being approximately the same as the D.C. voltage at the junction of said potentiometer, said third resistor and said second resistor to establish an operating bias between said input and common terminals of said transistor which is of substantially constant, fixed magnitude irrespective of the setting of said potentiometer;

means for developing a sawtooth shaped voltage; and means, including a capacitor shunted across said first resistor, for applying said sawtooth shaped voltage across the series combination of said potentiometer and said second resistor to impress a sawtooth shaped driving voltage between said input and common terminals of said transistor and to develop sawtooth shaped scanning current in said magnetic deflection yoke, adjustment of said tap varying the amplitude of said driving voltage to vary the amplitude of said scanning current while at the same time the bias of said transistor remains constant to maintain the transistor operating point fixed.

7. A cyclically operating transistorized scanning circuit comprising:

a free-running transistor relaxation oscillator including a transistor and a network of resistance means and capacitance means for determining the free-running frequency of said oscillator, said capacitance means including a plurality of series-connected capacitors included in the input circuit of said transistor and developing a voltage of generally sawtooth waveform;

a transistor amplifier;

a magnetic deflection yoke coupled to the output of said amplifier;

means coupling said capacitance means to the input of said amplifier for driving said amplifier with said sawtooth voltage to develop scanning current in said magnetic deflection yoke of generally sawtooth waveform but subject to undesired, non-linear distortion; and wave-shaping means, including at least one of said capacitors and a feedback connection coupled from the output of said amplifier to the junction of two of said capacitors, for substantially compensating said non-linear distortion thereby to linearize said scanning current in said yoke.

8. A cyclically operating transistorized scanning circuit comprising:

a free-running transistor relaxation oscillator including a transistor and a network of resistance means and capacitance means for determining the free-running frequency of said oscillator, said capacitance means including a plurality of series-connected capacitors included in the input circuit of said transistor and developing a voltage of generally sawtooth waveform;

a transistor amplifier;

a magnetic deflection yoke coupled to the output of said amplifier;

means coupling said capacitance means to the input of said amplifier for driving said amplifier with said sawtooth voltage to develop scanning current in said magnetic deflection yoke of generally sawtooth waveform but subject to undesired, non-linear distortion;

means for developing a feedback signal in the output of said amplifier;

wave-shaping means, including at least one of said capacitors and a feedback connection coupled to the junction of two of said capacitors for supplying said feedback signal to said one capacitor, for substantially compensating said non-linear distortion thereby to linearize said scanning current in said yoke; and adjustable linearity control means included in said feedback connection for adjusting the amplitude of said feedback signal to control the amount of non-linear compensation effected by said wave-shaping means.

9. A cyclically operating transistorized scanning circuit comprising:

a free-running transistor blocking oscillator including a transistor and a network of resistance means and capacitance means for determining the free-running frequency of said oscillator, said capacitance means including at least three series-connected capacitors included in the input circuit of said transistor and developing a voltage of generally sawtooth waveform;

an emitter follower amplifier;

a magnetic deflection yoke coupled to the output of said amplifier;

means coupling said capacitance means to the input of said amplifier for driving said amplifier with said sawtooth voltage to develop scanning current in said magnetic deflection yoke of generally sawtooth waveform but subject to undesired, non-linear distortion;

and wave-shaping means, including at least one of said capacitors and a feedback connection coupled from the output of said amplifier to the junction of two of said capacitors, for substantially compensating said non-linear distortion thereby to linearize said scanning current in said yoke.

10. A cyclically operating transistorized scanning circuit for a cathode ray tube comprising:

a free-running transistor relaxation oscillator including a transistor and a network of resistance means and capacitace means for determining the free-running frequency of said oscillator, said capacitance means including a plurality of series-connected capacitors included in the input circuit of said transistor and developing a voltage of generally sawtooth waveform;

a transistor amplifier;

deflection means for said cathode ray tube coupled to the output of said amplifier;

means coupling said capacitance means to the input of said amplifier for driving said amplifier with said sawtooth voltage to develop a deflection signal for said deflection means of generally sawtooth waveform but subject to predetermined distortion;

and wave-shaping means, including at least one of said capacitors and a feedback connection coupled from the output of said amplifier to the junction of two of said capacitors, for substantially compensating said distortion thereby to appropriately shape the waveform of said deflection signal.

11. A scanning circuit comprising:

an emitter follower amplifier having a relatively low internal output impedance;

a magnetic deflection yoke;

means coupling the output of said amplifier to said yoke;

means for developing a voltage of generally sawtooth waveform;

means for applying said sawtooth voltage to the input of said amplifier to develop scanning current in said magnetic deflection yoke of generally sawtooth waveform but subject to undesired, non-linear distortion;

means for developing a feedback signal in the output of said amplifier;

wave-shaping means, including a feedback connection for supplying said feedback signal to said sawtooth voltage developing means, for substantially compensating said non-linear distortion thereby to linearize said scanning current in said yoke, the operation of said wave-shaping means and the amount of compensation effected being influenced by and dependent on the output impedance presented by said amplifier to said feedback connection;

linearity control means included in said feedback connection for adjusting the amplitude of said feedback signal to control the amount of non-linear compensation effected by said wave-shaping means;

and an adjustable size control potentiometer included in said coupling means for adjusting the amplitude of said scanning current, the output impedance presented by said emitter follower amplifier to said feedback connection being sufficiently low that changes of the setting of the size control potentiometer effect no appreciable variation of that impedance thereby rendering size control and linearity control adjustments independent of each other in order that when one is adjusted there is no need to readjust the other.

12. A scanning circuit for a cathode ray tube comprising:

an emitter follower amplifier having a relatively low internal output impedance;

deflection means for said cathode ray tube;

means coupling the output of said amplifier to said deflection means;

means for developing a voltage of generally sawtooth waveform;

means for applying said sawtooth voltage to the input of said amplifier to develop a scanning signal for said deflection means of generally sawtooth waveform but subject to predetermined distortion;

means for developing a feedback signal in the output of said amplifier;

wave-shaping means, including a feedback connection for supplying said feedback signal to said sawtooth voltage developing means, for substantially compensating said distortion thereby to appropriately shape the waveform of said scanning signal, the operation of said wave-shaping means and the amount of compensation effected being influenced by and dependent on the output impedance presented by said amplifier to said feedback connection;

linearity control means included in said feedback connection for adjusting the amplitude of said feedback signal to control the amount of compensation effected by said wave-shaping means;

and an adjustable size control potentiometer included in said coupling means for adjusting the amplitude of said scanning signal, the output impedance presented by said emitter follower amplifier to said feedback connection being sufficiently low that changes of the setting of the size control potentiomeetr effect no appreciable variation of that impedance thereby rendering size control and linearity control adjustments independent of each other in order that when one is adjusted there is no need to readjust the other.

13. A scanning circuit comprising:

an amplifier including a transistor having input, output and common terminals;

a magnetic deflection yoke coupled to said output and common terminals;

means for applying a D.C. bias potential to said input and common terminals to translate D.C. bias current between said input and common terminals of a magnitude to bias said transistor for Class A operation, D.C. current thereby flowing between said common and output terminals;

means for developing a sawtooth shaped voltage having A.C. and D.C. components;

means for applying the A.C. component of said sawtooth shaped voltage to said input and common terminals to translate sawtooth shaped drive current between said input and common terminals to develop sawtooth shaped scanning current in said magnetic deflection yoke;

a size control potentiometer, having two end terminals and an intermediate adjustable tap, for adjusting the amplitude of the applied sawtooth voltage to vary the amplitude of said scanning current, the bias current flowing between said input and common terminals being subject to undesired amplitude variation at least on a transient basis with adjustment of said potentiometer thereby resulting in undesired amplitude change in the current flowing between said common and output terminals;

and means for establishing both of said end terminals of said potentiometer at approximately the same D.C. potential to render the magnitude of the bias current substantially fixed irrespective of the setting of said potentiometer.

14. A scanning circuit comprising:

an amplifier including a first junction-type transistor having a base, an emitter and a collector;

a magnetic deflection yoke coupled to the emitter and collector of said first transistor;

means for applying a D.C. bias potential between the base and emitter of said first transistor to translate D.C. bias current through the base-emitter junction of said first transistor of a magnitude to bias said first transistor for Class A operation, thereby resulting in emitter-collector D.C. current flow;

an emitter follower stage including a second junction-type transistor having an emitter at which a sawtooth shaped voltage having A.C. and D.C. components is produced;

means for applying the A.C. component of said sawtooth shaped voltage to the base and emitter of said first transistor to translate sawtooth shaped drive current through the base-emitter junction of said first transistor thereby to develop sawtooth shaped scanning current in said magnetic deflection yoke;

a size control potentiometer, having two end terminals and an intermediate adjustable tap, for adjusting the amplitude of the applied sawtooth voltage to vary the amplitude of said scanning current, the emitter-base bias current of said first transistor being subject to undesired amplitude variation at least on a transient basis with adjustment of said potentiometer thereby resulting in undesired amplitude change in the emitter-collector current flow of said first transistor;

and means for establishing both of said end terminals of said potentiometer at approximately the same D.C. potential to render the magnitude of the emitter-base bias current of said first transistor substantially fixed irrespective of the setting of said potentiometer.

15. A scanning circuit for a cathode ray tube comprising:

an amplifier including a transistor having input, output and common terminals;

deflection means for said cathode ray tube coupled to said output and common terminals;

means for applying a D.C. bias potential to said input and common terminals to translate D.C. bias current between said input and common terminals of a magnitude to bias said transistor for Class A operation, D.C. current thereby flowing between said common and output terminals;

means for developing a sawtooth shaped voltage having A.C. and D.C. components;

means for applying the A.C. component of said sawtooth shaped voltage to said input and common terminals to translate sawtooth shaped drive current between said input and common terminals thereby to develop a sawtooth shaped scanning signal for said deflection means;

a size control potentiometer, having two end terminals and an intermediate adjustable tap, for adjusting the amplitude of the applied sawtooth voltage to vary the amplitude of said scanning signal, the bias current flowing between said input and common terminals being subject to undesired amplitude variation at least on a transient basis with adjustment of said potentiometer thereby resulting in undesired amplitude change in the current flowing between said common and output terminals;

and means for establishing both of said end terminals of said potentiometer at approximately the same D.C. potential to render the magnitude of the bias current substantially fixed irrespective of the setting of said potentiometer.

References Cited

UNITED STATES PATENTS

| | | | |
|---|---|---|---|
| 3,229,151 | 1/1966 | Attwood | 315—27 |
| 2,954,503 | 9/1960 | Stone | 315—27 |
| 2,913,625 | 10/1959 | Finkelstein | 315—27 |

RODNEY D. BENNETT, Jr., *Primary Examiner.*

JOSEPH G. BAXTER, *Assistant Examiner.*